Aug. 2, 1932.  H. Y. NORWOOD  1,869,909
RECORDER
Filed April 17, 1929   3 Sheets-Sheet 1

INVENTOR:
Harry Y. Norwood
BY
ATTORNEY

Aug. 2, 1932.  H. Y. NORWOOD  1,869,909
RECORDER
Filed April 17, 1929   3 Sheets-Sheet 2

Fig. 3

Fig. 4

INVENTOR:
Harry Y. Norwood
BY
Alfred Burger
ATTORNEY

Aug. 2, 1932.  H. Y. NORWOOD  1,869,909
RECORDER
Filed April 17, 1929  3 Sheets-Sheet 3

INVENTOR:
Harry Y. Norwood
BY
Alfred Burger
ATTORNEY

Patented Aug. 2, 1932

1,869,909

UNITED STATES PATENT OFFICE

HARRY Y. NORWOOD, OF WEST RUSH, NEW YORK, ASSIGNOR TO TAYLOR INSTRUMENT COMPANIES, OF ROCHESTER, NEW YORK, A CORPORATION OF NEW YORK

RECORDER

Application filed April 17, 1929. Serial No. 355,862.

This invention relates to industrial thermometers and more in particular to recording thermometers.

In some industrial processes, such as the pasteurization of milk, it is desirable to have a full supervision of an extended temperature range, lying generally between 30° and 220° F., but the greatest interest centers around a small temperature range on opposite sides of the critical point, on which the authorities have not agreed, but which generally lies between 142° and 145° F. It is very important to know whether this critical temperature was reached and maintained during a predetermined period of time. To afford an assurance of accuracy such as is required for the critical range, the indication of an instrument covering the given range of 30°-220° is not sufficiently reliable.

Heretofore attempts have been made to amplify the indications of a critical range by so-called retard mechanism acting on the Bourdon spring or other pressure-sensitive device to retard its movement over a part of its path of motion and to allow it to act freely over another part of its path of motion whereby an indicating or recording chart may have an open or expanded scale portion corresponding to the free movements and a relatively condensed scale portion or portions corresponding to the retarded movement of the pressure-sensitive device.

The present invention has for its object an arrangement for indicating or recording temperature over a relatively wide range and at the same time indicating more accurately the temperature within a critical part of such range.

Figure 1:
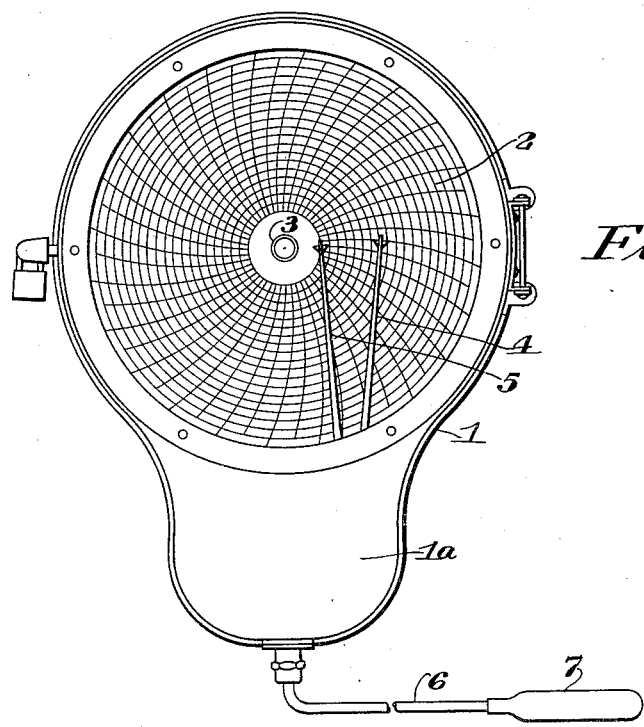
Figure 2:
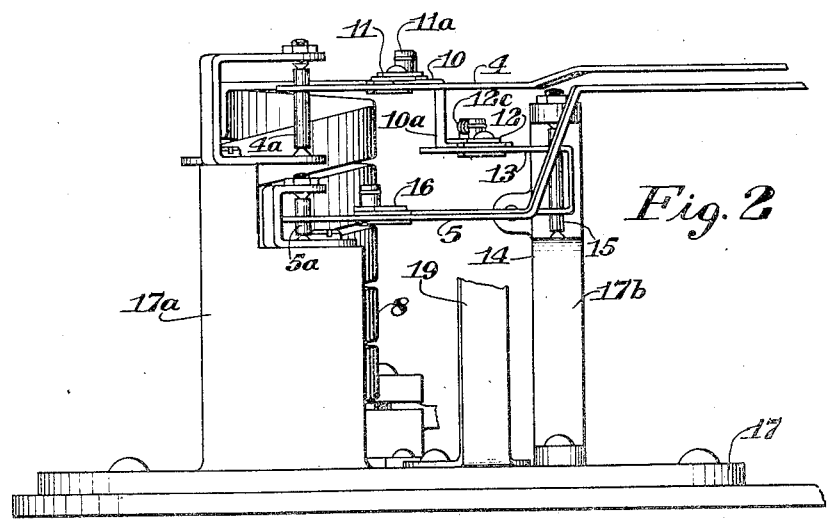

For a full understanding of the invention, its practical application and its advantages, reference is made to the accompanying drawings, wherein Fig. 1 is a more or less diagrammatic view of an apparatus embodying the invention;

Figs. 2, 3 and 4 are a side view, plan view and end view respectively of the mechanism with which the invention is more particularly identified; and Figs. 5-8 are fragmentary views of a recorder chart and the relative positions of the pen arms, representing different phases in the operation of the invention.

Having reference to Fig. 1, the device represented is a temperature recorder including a casing 1, a record chart 2 mounted for revolution on an arbor 3, pen arms 4 and 5, and mechanism disposed in the lower portion 1a of the casing for actuating the pen arms. This mechanism includes primarily a fluid-filled coil connected by means of a capillary 6 to a fluid-filled bulb 7.

Having now reference to Figs. 2, 3 and 4, the coil 8 represents one of the many forms of tubes of the Bourdon tube type and, so far as the scope of the invention is concerned, it represents all pressure-responsive devices commonly used as part of a fluid-filled system for measuring temperature. Coil 8, which is at one end stationary and connected to a capillary 9, carries at its other, free end an arm 10. Arm 10 is bent to provide two portions lying in parallel planes. The inner portion is connected by means of a link 11 with pen arm 4, while the outer depressed portion 10a is connected by means of link 12 and other mechanism, to be more fully described, with pen arm 5. The link 12 is connected with an arm 13 which together with another arm 14 is mounted for unitary movement on a pivot shaft 15, the arm 14 being in turn connected to a link 16 which is pivotally connected to the pen arm 5.

The two pen arms must necessarily move in different planes. As appears most clearly in Fig. 2, the arm 4 is in a higher plane than arm 5, but both are mounted to turn about the same axis. The pivot 4a on which pen arm 4 is mounted and the pivot 5a on which pen arm 5 is mounted are superposed substantially in axial alignments. The pivots 4a and 5a and also the pivot 15 are mounted on a support 17 including the uprights 17a and 17b respectively.

The arm 10 is provided with slots 10b and 10c, permitting adjustment of the pivot connections 11a and 12a for the links 11 and 12 lengthwise of arm 10. Links 11 and 12 are provided with slots 11b and 12b permitting movement of the links 11 and 12 respectively, relatively to the pivot connections 11a and 12a. A spring 11c connected at one end to the pivot connection 11a and at its other end to the link 11 tends to normally maintain the left corner of slot 11b (as seen in Fig. 3) in contact with the pivot connection 11a. Similarly a spring 12c connected at one end to the pivot connection 12a and at its other end to the link 12 tends to maintain the right corner of slot 12b (as seen in Fig. 3) in contact with the pivot connection 12a.

Arm 13 is provided with a slot 13a permitting adjustment of pivot connection 13b lengthwise of arm 13.

Link 16 is provided with a slot 16a permitting movement of link 16 relatively to the pivot connection 16b and a spring 16c connected at one end to the pivot connection 16b and at its other end to the link 16 tends to maintain the left corner of slot 16a (as seen in Fig. 3) in contact with the pivot connection 16b.

Pen arms 4 and 5 are provided with slots 4b and 5b respectively to permit adjustment of the pivot connections 4c and 5c.

The support 17b carries a set screw 18 serving as an adjustable abutment for limiting the movement of arm 14 in one direction. A stop 19 is mounted on the support 17 so as to limit the movement of the pen arms 4 and 5 toward the right (as seen in Fig. 3).

The operation of the apparatus described is as follows:

When the mercury or other fluid in the bulb 7 expands or contracts according to variations of the temperature conditions to which the bulb is exposed, the coil 8 expands or contracts accordingly and the arm 10 is caused to angularly move in unison with the free end of the coil.

Movement of the arm 10 is transmitted, on the one hand by means of the link 11 directly to the pen arm 4 and, on the other hand, by means of the link 12 to the arm 13 and from arm 14, which moves in unison with arm 13, through link 16 to pen arm 5.

As is apparent from the drawings, particularly Fig. 3, the link 11 is pivoted to arm 10 at a point nearer to the center of rotation of coil 8 than is link 12. The path of motion of pivot connection 12a is therefore correspondingly greater than that of pivot connection 11a. Since link 12 is connected to the arm 13 at a point nearer to the pivot shaft 15 then link 16 is connected to the arm 14, the movement imparted to link 12 is magnified in the ratio of the distance of pivot connections 16b and 13b from pivot shaft 15. It is thus apparent that the rate of angular movement of pen arm 5 is considerably greater than that of pen arm 4.

While there is considerable lattitude as to the ratio of angular motion of the two arms, the particular arrangement has been so dimensioned and adjusted that the pen arm 5 is caused to move across the whole chart range while the pen arm 4 moves through a very small portion of that range.

The operation may be more clearly understood in connection with Figs. 5-8. The pen arm 4 together with the link 11 and coil 8 represent the usual arrangement. They are so interconnected that for a temperature change between the limits of a definite temperature range, the expansive or contractive movement of the coil moves the pen or other marking element on the pen arm over the whole width of the chart and the chart is calibrated accordingly. Thus as indicated in the fragmentary views of the chart in Figs. 5-8, the pen of arm 4 moves from 0 to 225° during a temperature change from 0 to 225° or vice versa. The pen arm 5, on the other hand commences to move only after the temperature has risen to 126°. At 0 temperature, both pen arms are in their lowest position as indicated in Fig. 5. Then as the temperature rises, pen arm 4 alone moves until it reaches 126° as shown in Fig. 6. Upon further rise, pen arm 5 also begins to move and is in alignment with pen arm 4 at a temperature of 140° as indicated in Fig. 7. When pen arm 4 is at 148°, pen arm 5 has reached the upper end of its range as indicated in Fig. 8. Stop 18 prevents pen arm 5 from moving beyond the lower end of the scale and stop 19 prevents movement thereof beyond the upper end of the scale 21. When on its outward movement pen arm 5 comes into contact with stop 19, the slot 16a allowing pivot connection 16b to slide in it, permits continuation of movement of pen arm 4 while upon return of pen arm 5 to the stop 18, slot 12b allowing pivot connection 12 to slide in it, permits continuation of movement of pen arm 4 to the end of its scale. In the particular arrangement the ratio of scales 20 and 21 is 10:1 i. e. the scale divisions of scale 21 are ten times larger than that of scale 20 and the angular movement of pen arm 5 is ten times greater than that of pen arm 4.

The practical application of the arrangement is this: The cooperation of pen arm 4 and scale 20 affords a general survey and control of various steps in the pasteurization process, but the cooperation of pen arm 5 and scale 21 permits a very close and accurate supervision of the most essential and critical stage in the process. Small but important deviations from standard temperature conditions may not be readily detected on scale 20, but appear very clearly on scale 21. It is thus easy to know whether the pasteurization temperature was reached and how long it was maintained or whether a batch of milk was insufficiently or excessively heated.

In the foregoing I have described one particular embodiment of the invention. It is to be understood that much of the structural detail could be changed in various ways.

While I have described the invention in connection with recording mechanism and while it is more especially embodied in recording mechanism, it is by no means limited to recording mechanism, but may find application in indicating, regulating or other apparatus by which the control of conditions of temperature, pressure, etc., may be effected.

I claim:

1. In apparatus of the character described, the combination with a member sensitive to conditions to be controlled, constructed and arranged to move in response to variations of said conditions, of a plurality of separately movable elements and means for separately transmitting motion from the sensitive member to said elements causing them to move at different rates.

2. In apparatus of the character described, the combination with a member sensitive to conditions to be controlled, constructed and arranged to move in response to variations of said conditions, of a plurality of separately movable arms and means for separately transmitting motion from the sensitive member at different rates to said arms.

3. In apparatus of the character described, the combination with a member sensitive to conditions to be controlled, constructed and arranged to move in response to variations of said conditions, of two separately pivoted arms and means for separately transmitting motion from the sensitive member to said arms causing them to have different rates of angular movement.

4. In apparatus of the character described, the combination with a temperature-responsive member, of two separately pivoted arms, means for transmitting motion from the temperature-sensitive member to one of said arms to impart to it a definite rate of angular movement, means for transmitting motion from the temperature-sensitive member to the other of said arms to impart to it a greater rate of angular movement, means for limiting the angular movement of the arm having the greater rate of angular movement and means on the transmitting mechanism to said other arm, permitting movement of the transmitting mechanism when the movement of the arm has been arrested by the said limiting means.

5. In apparatus of the character described, the combination with a temperature-sensitive member having a definite movement for temperature changes within definite limits, a temperature scale, an arm cooperating with the scale, means for transmitting movement from the temperature-sensitive member to said arm, said transmitting means being constructed and arranged to move the arm over the scale during a small fraction of the movement of the said member, means for limiting the movement of the arm to the extent of the scale and means on the transmitting mechanism, permitting continuation of motion of the said member when the arm has reached the limits of its movement.

In testimony whereof I affix my signature.

HARRY Y. NORWOOD.